US012053975B2

(12) United States Patent
Hada et al.

(10) Patent No.: US 12,053,975 B2
(45) Date of Patent: Aug. 6, 2024

(54) PRINTING APPARATUS AND CONVEYANCE CONTROL METHOD THEREOF

(71) Applicant: CANON KABUSHIKI KAISHA, Tokyo (JP)

(72) Inventors: Noboru Hada, Kanagawa (JP); Masato Eiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 17/308,544

(22) Filed: May 5, 2021

(65) Prior Publication Data

US 2021/0354483 A1 Nov. 18, 2021

(30) Foreign Application Priority Data

May 14, 2020 (JP) ................................ 2020-085492

(51) Int. Cl.

| | |
|---|---|
| ***B41J 11/20*** | (2006.01) |
| ***B41J 11/00*** | (2006.01) |
| ***B41J 11/42*** | (2006.01) |
| ***B41J 11/66*** | (2006.01) |
| ***B41J 11/70*** | (2006.01) |
| ***B41J 13/02*** | (2006.01) |
| ***B41J 13/03*** | (2006.01) |
| ***B41J 15/04*** | (2006.01) |

(52) U.S. Cl.

CPC ............. *B41J 11/20* (2013.01); *B41J 11/007* (2013.01); *B41J 11/42* (2013.01); *B41J 11/663* (2013.01); *B41J 11/70* (2013.01); *B41J 13/025* (2013.01); *B41J 13/03* (2013.01); *B41J 15/04* (2013.01)

(58) Field of Classification Search

CPC ......... B41J 11/42; B41J 11/007; B41J 11/663; B41J 13/03

See application file for complete search history.

(56) References Cited

U.S. PATENT DOCUMENTS

| | | | | |
|---|---|---|---|---|
| 6,550,907 | B2 * | 4/2003 | Uchida | B41J 13/0027 347/104 |
| 10,421,299 | B2 | 9/2019 | Daikoku et al. | |
| 10,427,431 | B2 | 10/2019 | Masuda et al. | |
| 10,597,247 | B2 | 3/2020 | Eiyama et al. | |
| 10,703,117 | B2 | 7/2020 | Eiyama et al. | |
| 10,766,279 | B2 | 9/2020 | Yasuda et al. | |
| 10,829,329 | B2 | 11/2020 | Suzuki et al. | |

FOREIGN PATENT DOCUMENTS

| | | |
|---|---|---|
| JP | 2009-220498 A | 10/2009 |

* cited by examiner

*Primary Examiner* — Jeremy R Severson

(74) *Attorney, Agent, or Firm* — Venable LLP

(57) ABSTRACT

A printing apparatus includes a first roller that nips and conveys, in a conveyance direction, a printing medium, a second roller that nips and conveys the printing medium at a downstream side of the first roller in the conveyance direction, a print unit that prints an image on the printing medium conveyed by the second roller, and a control unit that, until printing by the print unit reaches a vicinity of a trailing end of a print length, sets a nip pressure of the first roller to a first pressure, and when printing by the print unit reaches the vicinity of the trailing end of the print length, sets the nip pressure of the first roller to a second pressure that is higher than the first pressure.

16 Claims, 6 Drawing Sheets

PRINTING APPARATUS AND CONVEYANCE CONTROL METHOD THEREOF

BACKGROUND OF THE INVENTION

Field of the Invention

The present invention relates to a printing apparatus and a conveyance control method thereof.

Description of the Related Art

Conventionally, printing apparatuses that print images with an image forming unit using continuous sheets such as a roll sheet are known. For example, Japanese Patent Laid-Open No. 2009-220498 discloses an image forming apparatus that feeds, to an image forming unit that uses an electrographic method, a roll sheet that is loaded onto a roll sheet feeding apparatus and then forms images on the roll sheet using the unit.

According to Japanese Patent Laid-Open No. 2009-220498, a roll sheet, which is fed from a roll sheet feeding apparatus via a feed roller and then a cutter, is formed into a loop in front of an image forming unit on a conveyance path thereof. Then, the sheet length of the roll sheet that is fed to the image forming unit from the feed rollers is measured; if the sheet length is greater than a stipulated value that is set in advance, rotation information that is used to calculate the sheet length is corrected, and if the sheet length is less than or equal to the stipulated value that is set in advance, the rotation information is not corrected.

For this rotation information, a number of pulses of a pulse signal that controls a motor that drives the feed roller is used.

Furthermore, in a case where the sheet length is greater than or equal to the stipulated value that is set in advance, the amount of slack (loop) that is formed is reduced, whereas in a case where the sheet length is shorter than the stipulated value that is set in advance, the amount of slack (loop) that is formed is controlled so as not to be reduced. Also, the continuous sheet is cut with the cutter based on a calculation result, which is a calculated sheet length.

According to the conventional technique that was proposed by Japanese Patent Laid-Open No. 2009-220498 as described above, slack (a loop) is formed in a continuous sheet such as a roll sheet on a conveyance path on which the continuous sheet is fed, and then the sheet is cut using the time it takes for the loop to be eliminated. Then, it is determined, in accordance with whether a length to be fed is longer or shorter than a predetermined sheet length, whether to feed the continuous sheet while maintaining the slack (loop) or to reduce the slack (loop) and then feed the continuous sheet. Furthermore, in a case where the length to be fed is longer than the predetermined sheet length, by performing correction processing on the measured value of the sheet length, errors that are generated due to the rollers slipping and the like are corrected.

According to the conventional example as described above, in accordance with a length and a paper quality of a sheet to be fed and/or environmental conditions, switches between creating a loop and reducing a loop of the sheet are performed; furthermore, in a case where the length is longer than a predetermined sheet length, correction of the amount of rotation of a feed roller, for which a sheet feed rate has been calculated, is performed.

SUMMARY OF THE INVENTION

According to one embodiment of the present invention, there is provided a printing apparatus comprising: a first roller configured to nip and convey, in a conveyance direction, a printing medium; a second roller configured to nip and convey a printing medium at a downstream side of the first roller in the conveyance direction; a print unit configured to print an image on a printing medium conveyed by the second roller; and a control unit configured to, until printing by the print unit reaches a vicinity of a trailing end of a print length, set a nip pressure of the first roller to a first pressure, and when printing by the print unit reaches the vicinity of the trailing end of the print length, set the nip pressure of the first roller to a second pressure that is greater than the first pressure.

According to another embodiment of the present invention, there is provided a printing apparatus comprising: a first roller configured to nip and convey, in a conveyance direction, a printing medium; a second roller configured to nip and convey a printing medium at a downstream side of the first roller in the conveyance direction; a print unit configured to print an image on a printing medium conveyed by the second roller; and a control unit configured to set a conveying speed of a printing medium by the first roller, after printing by the print unit reaches the vicinity of the trailing end of the print length, to be greater than a conveying speed of the first roller, until printing by the print unit reaches the vicinity of the trailing end of the print length.

According to still another embodiment of the present invention, there is provided a conveyance control method of a printing apparatus having a first roller that nips and conveys, in a conveyance direction, a printing medium; a second roller that nips and conveys a printing medium at a downstream side of the first roller in the conveyance direction; and a print unit that prints an image on a printing medium conveyed by the second roller, the method comprising: controlling, until printing by the print unit reaches a vicinity of a trailing end of a print length, set a nip pressure of the first roller to a first pressure, and when printing by the print unit reaches the vicinity of the trailing end of the print length, set the nip pressure of the first roller to a second pressure that is greater than the first pressure.

Further features of the present invention will become apparent from the following description of exemplary embodiments (with reference to the attached drawings).

DESCRIPTION OF THE EMBODIMENTS

Figure 1:
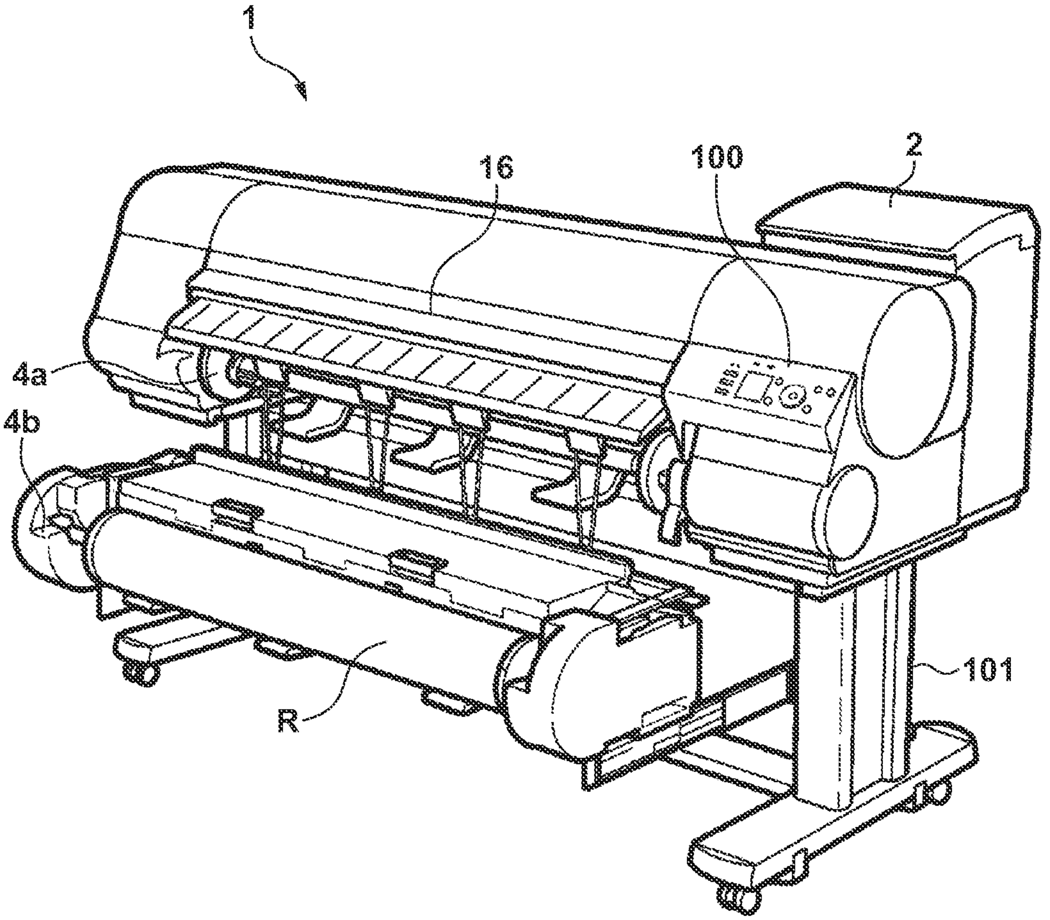
FIG. 1 is an external perspective view illustrating a schematic configuration of an ink-jet printing apparatus that is a representative embodiment of the present invention.

However, in the above conventional example, in cases of apparatuses that perform printing using large-sized sheets such as AO and BO, correction amounts change significantly depending on the print environment and the sheets. Also, in a case where a printing sheet is nipped and conveyed by conveyance rollers, the sheet slips between the conveyance rollers during the conveyance, and a difference is generated between a conveyance amount that is calculated from the rotation of the conveyance rollers and an actual conveyance amount of the sheet. Particularly in cases of continuous sheets such as large-sized AO and BO sheets and roll sheets, the length of conveyance is long, and therefore, conveyance error due to slipping accumulates and becomes large. By this, accurate execution of a printing operation becomes impaired.

Embodiments of the present invention provide a printing apparatus that can reduce conveyance errors due to conveyance rollers, perform accurate conveyance, and achieve high-quality image printing, and a conveyance control method thereof.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in this specification, "print" encompasses forming not only meaningful information such as characters and shapes, but also meaningless information. Furthermore, "print" broadly encompasses cases in which an image or pattern is formed on a printing medium irrespective of whether or not it is something that a person can visually perceive, and cases in which a medium is processed.

Also, "printing medium" broadly encompasses not only paper used in a typical printing apparatus, but also things that can receive ink such as cloths, plastic films, metal plates, glass, ceramics, wood materials, hides or the like.

Furthermore, similarly to the foregoing definition of "print", "ink" (also referred to as "liquid") should be broadly interpreted. Therefore, it is assumed that the liquid is a liquid which can be subjected to the formation of an image, a pattern, or the like, or the processing of the printing medium, or the processing of the ink (for example, the solidification or insolubilization of the colorant in the ink to be applied to the printing medium) by being applied onto the printing medium.

Furthermore, "nozzle", unless specified otherwise, encompasses a discharge port and an element that produces energy that is used for discharge of ink and a fluid channel that communicates therewith collectively.

An element substrate for a printhead (a head substrate) used below does not indicate a mere substrate consisting of a silicon semiconductor but rather indicates a configuration in which elements, wiring lines, and the like are disposed.

Furthermore, "on the substrate" means not only simply on top of the element substrate, but also the surface of the element substrate, and the inside of the element substrate in the vicinity of the surface. Also, "built-in" in the present invention does not mean that separate elements are simply arranged as separate bodies on a substrate surface, but rather means that the elements are formed and manufactured integrally on the element board by a semiconductor circuit manufacturing process.

<Overview of Printing Apparatus (FIG. 1)>

FIG. 1 is a schematic perspective view of an ink-jet printing apparatus (hereinafter, a printing apparatus) that is a representative embodiment of the present invention.

As illustrated in FIG. 1, in a printing apparatus 1, an operation panel 100 for performing various settings that are related to printing and displaying states of the apparatus is arranged. Also, the printing apparatus 1 is supported by a stand 101, and a print unit thereof is normally covered by a cover 16 that can be opened/closed. Furthermore, the printing apparatus 1 has an ink tank cover 2 that is operated when replacing ink tanks. The printing apparatus 1, as described later, has a print width that corresponds to the width direction of printing media and comprises a full-line printhead (hereinafter, printhead) as a print unit that prints images by discharging ink droplets onto the printing media.

The printhead is configured by printheads, which have the same configuration, of four colors: black (K), cyan (C), magenta (M), and yellow (Y). Accordingly, four ink tanks containing black, cyan, magenta, and yellow ink, respectively, are housed under the ink tank cover 2. These ink tanks can be replaced independently of each other.

The printing apparatus 1 is loaded with a printing medium such as a rolled sheet that has a width, which correspond to the print width of the printhead, for example, of 10 inches to 40 inches, and can perform printing by conveying the printing medium to a printing region of the printhead.

Note that as illustrated in FIG. 1, printing media such as a continuous sheet in a rolled shape can be stored in two levels (a roll sheet attachment unit *4a* of an upper level, and a roll sheet attachment unit *4b* of a lower level), and printing is possible in relation to either of the attached rolled sheets. Note that in FIG. 1, a state in which a roll sheet R is attached onto the roll sheet attachment unit *4b* of the lower level is illustrated.

Next, a configuration of the printhead will be described further in detail.

<Description of Configuration of Printhead(s) (FIG. 2)>

Figure 2:
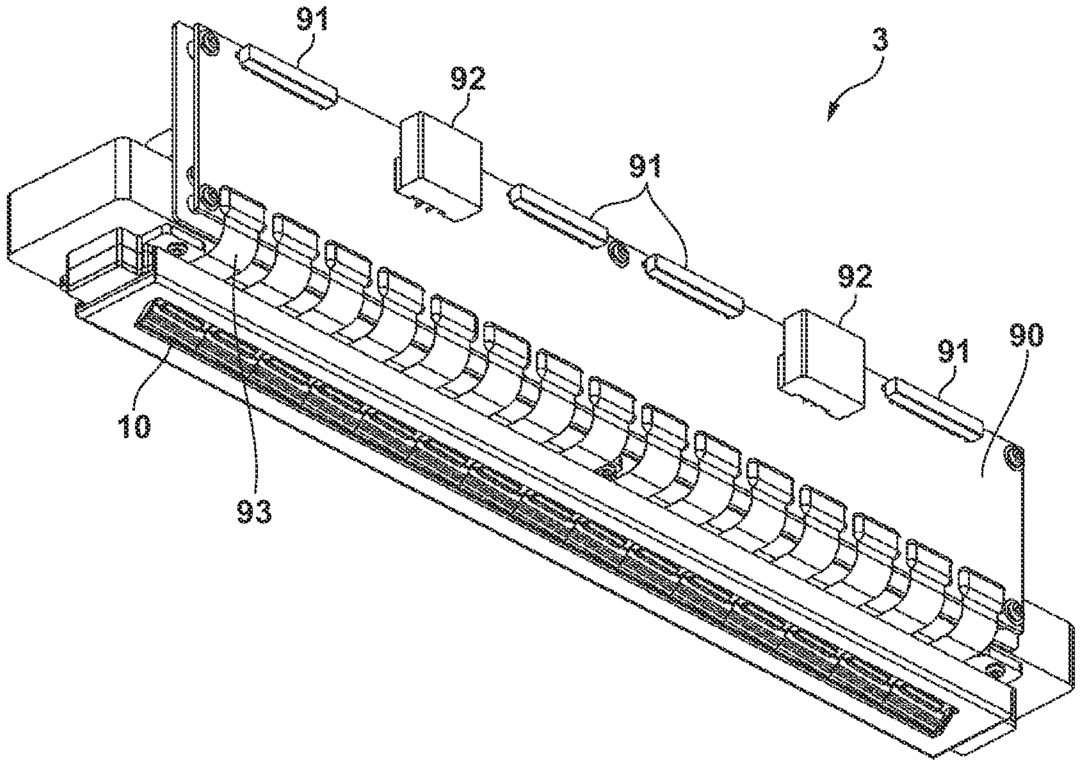
FIG. 2 is a perspective view illustrating a schematic configuration of a printhead.

FIG. 2 is a perspective view illustrating a schematic configuration of a printhead 3. The printhead 3 is a line-type printhead on which fifteen arrays of element substrates 10, each capable of discharging one of four colors of ink C/M/Y/K, are arranged linearly (arranged in a line). Note that other than this kind of an arrangement, it may be set so that four printheads 3, each of which is formed to discharge one color ink, will be arranged in the conveyance direction of the printing medium to discharge the four colors of ink C/M/Y/K.

As illustrated in FIG. 2, the printhead 3 comprises the element substrates 10 and signal input terminals 91 and power supply terminals 92, which are connected electrically via flexible wiring substrates 93 and an electric wiring substrate 90. The signal input terminals 91 and the power supply terminals 92 are connected electrically with a control unit of the printing apparatus 1 and supply the element substrates 10 with power that is necessary for discharge drive signals and discharge, respectively. The number of signal input terminals 91 and the number of power supply terminals 92 can be made smaller than the number of the element substrates 10 by integrating the wiring by the electrical circuit in the electric wiring substrate 90. By this, the number of electrical connection portions that need to be detached when attaching the printhead 3 in relation to the printing apparatus 1 or when replacing the printhead can be kept small.

On the element substrates 10, electrothermal transducing elements (heaters; not shown) are formed corresponding to each discharge port; the electrothermal transducing elements generate bubbles in the ink by Joule heating, and with bubble generating energy thereof, cause the ink to be discharged from the discharge ports.

<Description of Control Configuration (FIG. 3)>

Figure 3:
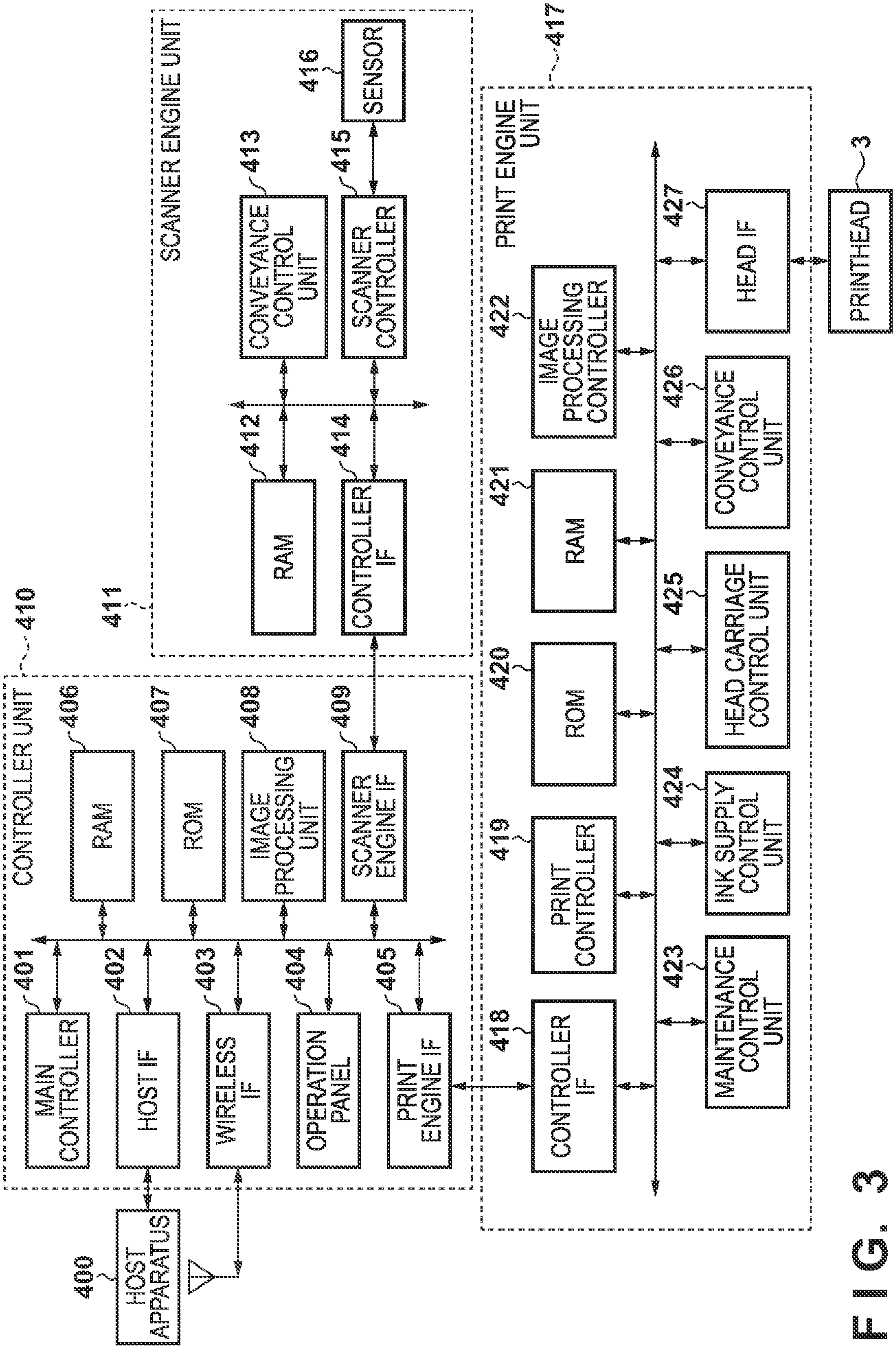
FIG. 3 is a block diagram illustrating a configuration for controlling a printing apparatus illustrated in FIG. 1.

FIG. 3 is a block diagram illustrating a configuration of a control circuit of the printing apparatus 1.

As illustrated in FIG. 3, the printing apparatus 1 is configured by a print engine unit 417 that mainly controls the print unit, a scanner engine unit 411 that controls a scanner unit, and a controller unit 410 that controls the entire printing apparatus 1. A print controller 419 incorporating an MPU and a non-volatile memory (an EEPROM or the like) controls the various kinds of mechanisms of the print engine unit 417 in accordance with instructions from a main controller 401 of the controller unit 410. The various kinds of mechanisms of the scanner engine unit 411 are controlled by the main controller 401 of the controller unit 410.

The details of the control arrangement will be described hereinafter.

In the controller unit 410, the main controller 401 that is configured by a CPU controls the entire printing apparatus 1 in accordance with programs and various kinds of parameters stored in a ROM 407 while using a RAM 406 as a work area. For example, when a print job is input from a host apparatus 400 via a host I/F 402 or a wireless I/F 403, an image processing unit 408 will perform predetermined image processing on received image data in accordance with the instruction of the main controller 401. The main controller 401 transmits the image data that has undergone the image processing to the print engine unit 417 via a print engine I/F 405.

Note that the printing apparatus 1 may obtain image data from the host apparatus 400 via wireless communication or wired communication, and may obtain image data from an external storage apparatus (such as a USB memory) that is connected to the printing apparatus 1. The communication method to be used in the wireless communication or the wired communication is not limited. For example, Wi-Fi® (Wireless Fidelity) or Bluetooth® is applicable as the communication method used in the wireless communication. Also, for example, a USB (Universal Serial Bus) or the like is applicable as the communication method used in the wired communication. Furthermore, for example, when a read instruction is input from the host apparatus 400, the main controller 401 transmits this instruction to the scanner engine unit 411 via a scanner engine I/F 409.

An operation panel 404 is a unit for a user to perform input/output in relation to the printing apparatus 1. Via the operation panel 404, the user can instruct an operation such as a copy operation or a scan operation, set a printing mode, or recognize information of the printing apparatus 1.

In the print engine unit 417, the print controller 419 that is configured by a CPU controls the various kinds of mechanisms of the print engine unit 417 in accordance with programs and various kinds of parameters stored in a ROM 420 with a RAM 421 as a work area.

When various kinds of commands and image data are received via a controller I/F 418, the print controller 419 temporarily stores these commands and image data in the RAM 421. The print controller 419 causes an image processing controller 422 to convert the stored image data into print data so that the printhead 3 can use the data in the printing operation. When the print data is generated, the print controller 419 causes the printhead 3 to execute a printing operation based on the print data via a head I/F 427. At this time, the print controller 419 drives conveyance rollers 28 and an LF roller 29 via a conveyance control unit 426 to convey the printing medium. Print processing is performed under the instruction of the print controller 419 by executing the printing operation by the printhead 3 in combination with the conveyance operation of the printing medium.

A head carriage control unit 425 changes the direction and the position of the printhead 3 in accordance with a maintenance state or an operation state such as a print state of the printing apparatus 1. An ink supply control unit 424 controls a liquid supply unit 220 so that the pressure of ink supplied to the printhead 3 will fall within a suitable range. A maintenance control unit 423 controls the operation of a cap unit and a wiping unit in a maintenance unit (not shown) when a maintenance operation that is related to the printhead 3 is performed.

In the scanner engine unit 411, the main controller 401 controls the hardware resources of a scanner controller 415 in accordance with the programs and various kinds of parameters stored in the ROM 407 while using the RAM 406 as a work area. By this, various kinds of mechanisms included in the scanner engine unit 411 are controlled. For example, the main controller 401 controls the hardware resources in the scanner controller 415 via a controller I/F 414, conveys an original, which has been placed on an ADF (not shown) by the user, via a conveyance control unit 413, and then reads the original by a sensor 416. Then, the scanner controller 415 stores the read image data in a RAM 412.

Note that the print controller 419 can convert image data obtained in the manner described above into print data to cause the printhead 3 to execute a printing operation based on the image data read by the scanner controller 415.

<Description of Configuration of Conveying Roll Sheet (FIG. 4)>

Figure 4:
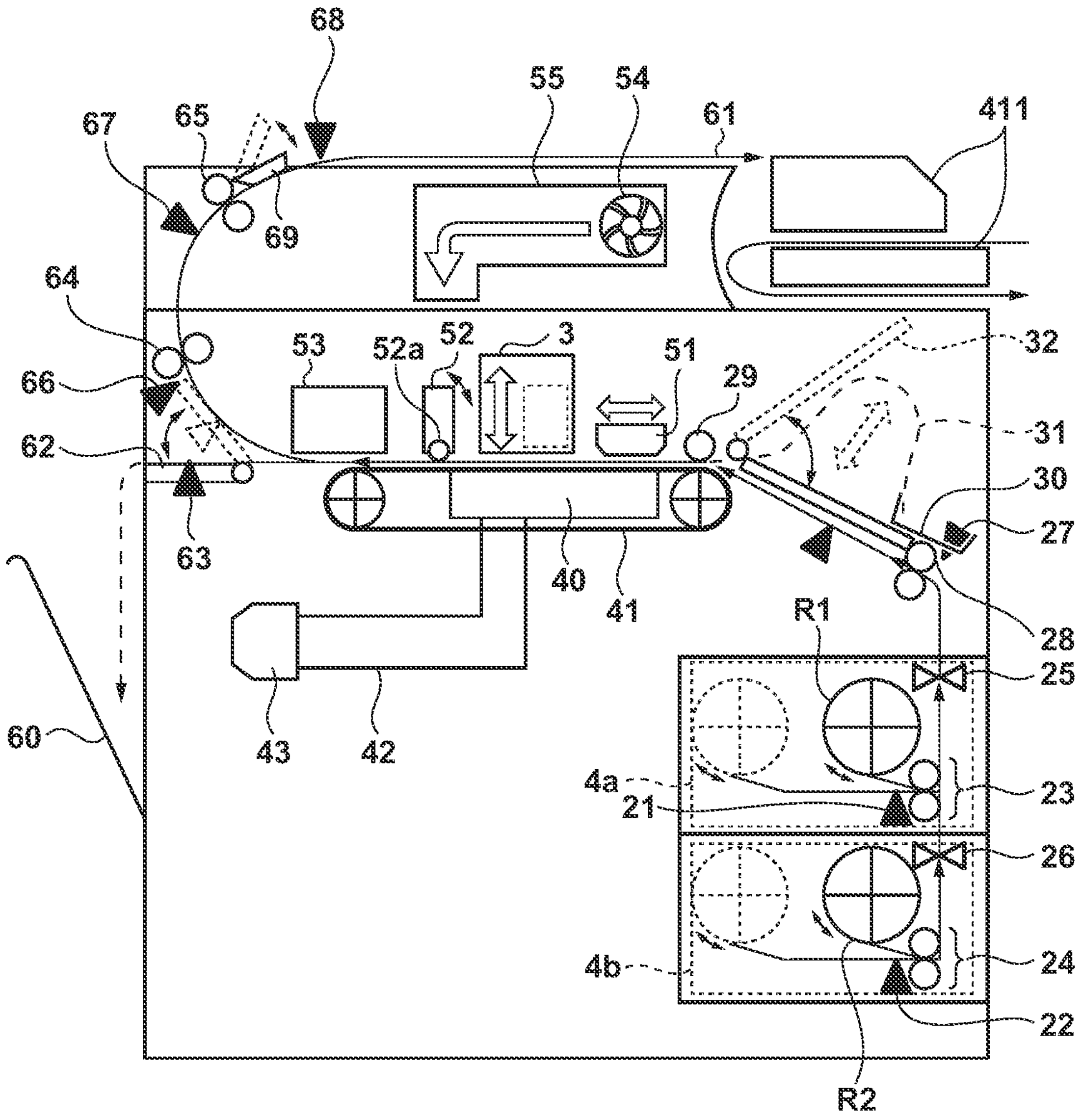
FIG. 4 is an overview of a cross section of the printing apparatus illustrated in FIG. 1 and is a view schematically illustrating a configuration for conveying a roll sheet.

FIG. 4 is a side sectional view of the printing apparatus 1 illustrated in FIG. 1 and schematically illustrates a configuration for conveying a roll sheet. In FIG. 4, a state in which a roll sheet R1 and a roll sheet R2 are loaded onto the roll sheet attachment unit 4*a* and the roll sheet attachment unit 4*b* respectively is illustrated. In FIG. 4, when the user loads the roll sheet R1 onto a portion in dashed lines in the roll sheet attachment unit 4*a*, the roll sheet R1 moves by rotation to a shaded portion and then is fixed and attached onto the printing apparatus. Similarly, when the user loads the roll sheet R2 onto a portion in dashed lines in the roll sheet attachment unit 4*b*, the roll sheet R2 moves by rotation to a shaded portion and then is fixed and attached onto the printing apparatus.

For example, in regards to printing images onto the roll sheet R1, when a feeding motor (not shown) that is attached onto a rotation axis of the roll sheet attachment unit 4*a* is driven, a leading end of the roll sheet R1 is fed, and when the leading end is detected by a sheet feeding sensor 21, it is nipped by a pair of feed rollers 23. Then, the leading end of the roll sheet R1 is further conveyed by the rotation of the pair of feed rollers 23, and then the leading end portion of the roll sheet R1 is cut by a cutter 25, thereby having its shape trimmed.

Similarly, in a case where an image is printed on the roll sheet R2, when a feeding motor (not shown) that is attached onto a rotation axis of the roll sheet attachment unit 4*b* is driven, a leading end of the roll sheet R2 is fed, and when the leading end is detected by a sheet feeding sensor 22, it is nipped by a pair of feed rollers 24. Then, the leading end of the roll sheet R2 is further conveyed by the rotation of the pair of feed rollers 24, and then the leading end portion of the roll sheet R2 is cut by a cutter 26, thereby having its shape trimmed.

A roll sheet whose leading end has been trimmed by either the cutter 25 or 26 is further fed in the direction of the arrows, and when the leading end is detected by a leading end detection sensor 27, the conveyance rollers are driven and then start to rotate. Then, the roll sheet whose leading end is nipped by conveyance rollers 28 is further conveyed and then reaches the LF roller 29. When the leading end of the roll sheet is nipped by the LF roller 29, the conveyance of the roll sheet is performed by the LF roller 29 and the conveyance rollers 28, and then the roll sheet is conveyed on a conveyance belt 41. Note that a fixed guide 30 is disposed in the vicinity of the leading end detection sensor 27, and by this, smooth conveyance of the roll sheet is supported.

At this time, when a rotation speed (V0) of the LF roller 29 and a rotation speed (V) of the conveyance rollers 28 are caused to be slightly different so as to control V to be slightly greater than V0, a loop 31 is formed in the roll sheet as illustrated in a dashed line in FIG. 4. A configuration is taken such that a flapper 32 whose one end is fixed and freely rotates using the fixed portion as a rotation axis rotates in accordance with the formation of the loop 31 so as not to impede the roll sheet from forming a loop.

Note that if the effects of friction and slips between each of the LF roller 29 and the conveyance rollers 28 and the roll sheet are ignored, each of the rotation speed of the LF roller 29 and the rotation speed of the conveyance rollers 28 corresponds to the conveying speed of the roll sheet at the nip portion between each roller and the roll sheet.

In such a state, the roll sheet is further conveyed and then reaches a printing position between a lower portion of the printhead 3 and a platen 40.

As illustrated in FIG. 4, the platen 40 is disposed under the conveyance belt 41 that conveys the roll sheet between an upstream side and a downstream side, in regards to the conveyance direction of the roll sheet, of the printhead 3, and the platen 40 is connected to a suction fan 43 via a duct 42. With such a configuration, by operating the suction fan 43, suctioning the air inside the duct 42, and generating a negative pressure, the roll sheet is caused to adhere to the conveyance belt 41 through the holes that are disposed on the platen 40, and the roll sheet is prevented from being lifted off during conveyance.

Also, in regards to the conveyance direction of the roll sheet, on the upstream side of the printhead 3, a recovery unit 51 is disposed and on the downstream side of the printhead 3, a cap 52 and a drying unit 53 are disposed. As illustrated in FIG. 4, configuration is taken such that the recovery unit 51 can move in the conveyance direction of the roll sheet and the cap 52 can rotate about a rotation axis 52*a*. Furthermore, the printhead 3 has a print width that corresponds to the width of the roll sheet, which is the printing medium as described above, and although it is fixed during printing, in cases aside from a printing operation, configuration is taken so as to be able to move in an up-and-down direction as indicated by arrows in FIG. 4.

By such a configuration, in a case where, for example, a discharge state of the printhead 3 is to be recovered, the printhead 3 moves upward and the recovery unit 51 is moved into a space that has been created thereby. Then, the recovery unit 51 executes a recovery operation by wiping the ink discharge surface of the printhead 3, suctioning the discharge ports thereof, causing the printhead 3 to perform a preliminary discharge, and the like. Note that these operations are well-known techniques, and therefore, description thereof is omitted.

Meanwhile, in a case where neither the printing operation nor the recovery operation is performed, in order to prevent the ink discharge surface of the printhead 3 from drying, the printhead 3 is moved upward and the cap 52 is rotated into the space that has been created thereby. Then, the printhead 3 is moved downward and the printhead 3 is capped by the cap 52.

Also, by operating the drying unit 53 and then heating the surface of the roll sheet, the roll sheet on which printing has been completed by discharging ink from the printhead 3 is dried. This prevents the roll sheet that is in a wet state after printing from being further conveyed and then soiling the inside of the apparatus (particularly the conveyance path of the roll sheet) with ink. Furthermore, a fan 54 and a duct 55 are disposed above the printhead 3, and by operating the fan 54, the air from the outside is blown in the direction of the arrow via the duct 55, thereby promoting the roll sheet, after printing, to dry.

Then, by either a user instruction from the operation panel 100 or an instruction from the host apparatus 400, the printing length (L) in the conveyance direction of the roll sheet is specified. Then, once it is confirmed that the roll sheet whose leading end has been trimmed with either the cutter 25 or 26 has been conveyed the printing length (L) from the leading end, the trailing end thereof is cut with either the cutter 25 or 26.

The roll sheet on which printing has been performed with the printhead 3 and whose trailing end has been cut (from this point onward, referred to as a cut sheet) is discharged into a back surface basket 60 or onto a front surface stacker 61. The selection of the discharge location is performed either by a user instruction from the operation panel 100 or an instruction from the host apparatus 400.

In a case where the cut sheet is to be discharged into the back surface basket 60, a flapper 62 rotates and then forms a conveyance path in the direction of the back surface basket 60. By this, the cut sheet is conveyed by the rotation of the conveyance belt 41 and then drops into the back surface basket 60 as indicated by a dashed line in FIG. 4. Note that detection of the leading end, passing through being in progress, and the trailing end of the cut sheet is performed with output signals from a sheet sensor 63.

In contrast to this, in a case where the cut sheet is to be discharged onto the front surface stacker 61, the flapper 62 rotates and becomes positioned at a location that is indicated with dashed lines, thereby forming a conveyance path in the direction of the front surface stacker 61. By this, the cut sheet is conveyed by the rotation of the conveyance belt 41, reaches a pair of discharge rollers 64 and then a pair of discharge rollers 65, and in the end, is discharged onto the front surface stacker 61. Note that sheet sensors 66 and 67 and a discharge sensor 68 are disposed on the conveyance path to the front surface stacker 61, and a discharge state of the cut sheet is detected thereby. Also, a trailing end holding lever 69 is disposed between the pair of discharge rollers 65 and the discharge sensor 68, thereby preventing the trailing end of the cut sheet from being lifted off and supporting a smooth discharge of the cut sheet.

Note that the scanner engine unit 411, by having the user insert an image original in the direction of a solid line of an arrow, reads its image. However, as the configuration of the scanner engine unit 411 uses a conventional configuration, description will be omitted here.

Next, roll sheet conveyance control to be executed in the printing apparatus of the above configuration will be described in detail.

Figure 5A:
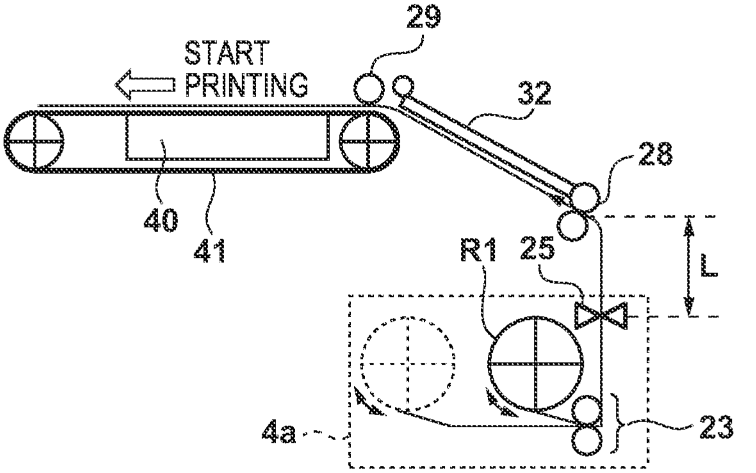
FIG. 5A is a view illustrating a roll sheet conveyance sequence in which the roll sheet is fed from a roll sheet attachment unit, printing is performed, and then a trailing end of the roll sheet is cut.
Figure 5B:
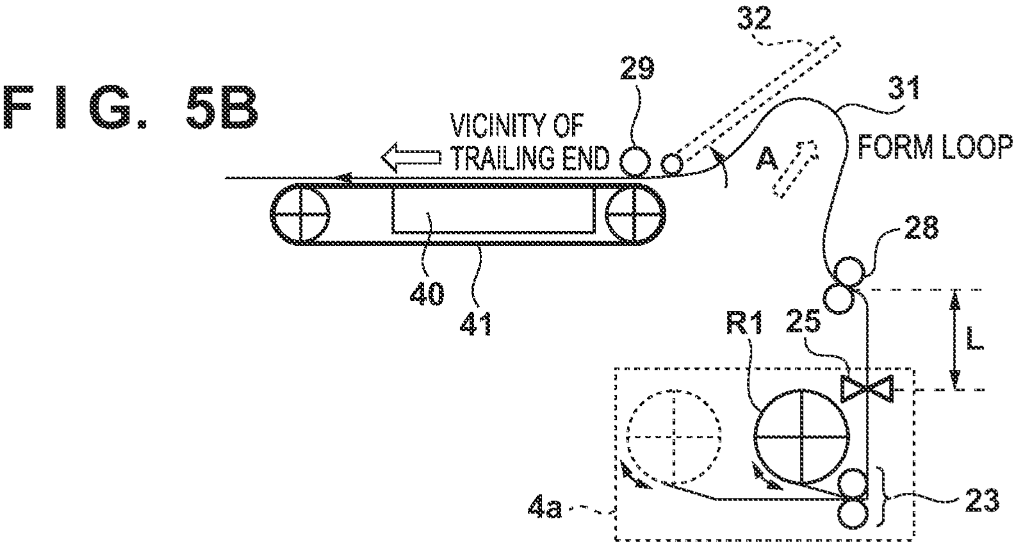
FIG. 5B is a view illustrating a roll sheet conveyance sequence in which the roll sheet is fed from a roll sheet attachment unit, printing is performed, and then a trailing end of the roll sheet is cut.
Figure 5C:
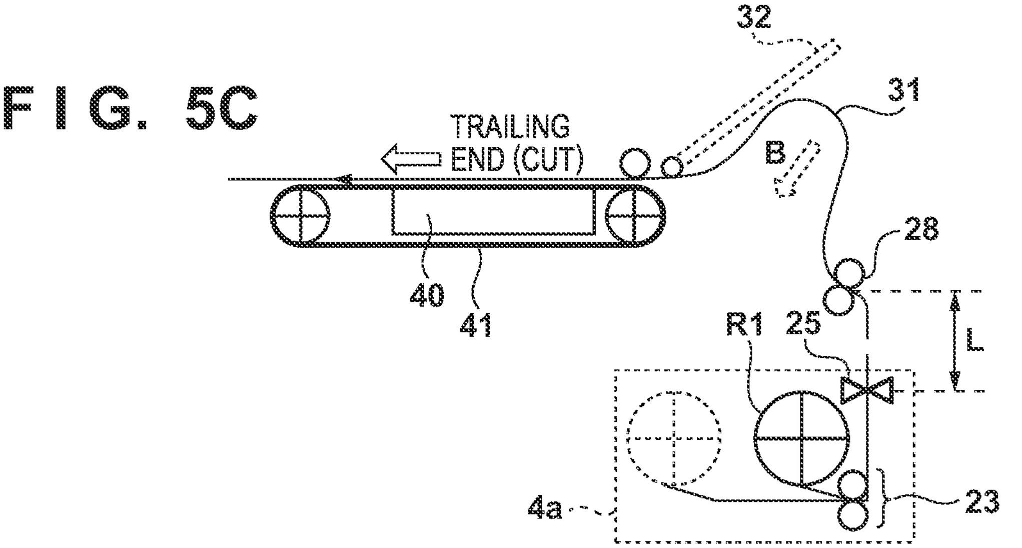
FIG. 5C is a view illustrating a roll sheet conveyance sequence in which the roll sheet is fed from a roll sheet attachment unit, printing is performed, and then a trailing end of the roll sheet is cut.

FIGS. 5A to 5C are views illustrating a roll sheet conveyance sequence in which the roll sheet is fed from a roll sheet attachment unit, printing is performed, and then a trailing end of the roll sheet is cut. In FIGS. 5A to 5C, a sequence of supplying the roll sheet R1 from the roll sheet attachment unit 4*a* and nipping and then conveying the roll sheet with the conveyance rollers 28 and the LF roller 29 is illustrated.

Note that as reference numerals indicating components that are used in FIGS. 5A to 5C have all been described with reference to FIG. 4, description thereof will be omitted. Also, in FIGS. 5A to 5C, L is a distance between a cutting position of the cutter 25 and a nip point of the conveyance rollers 28 in the conveyance path on the roll sheet.

In this embodiment, the nip pressure of the conveyance rollers 28 can be switched between two stages: "strong" and "weak", and the rotation speed (V) of the conveyance rollers 28 can be switched between two stages: a rotation speed that is the same as the rotation speed (V0) of the LF roller 29 and a rotation speed (V1) that is slightly faster than that.

FIG. 5A illustrates a state of conveying the roll sheet from the start of supplying the roll sheet R1 from the roll sheet attachment unit 4*a* until it is conveyed to the printing position and then the printing is started by the printhead 3. At this time, the flapper 32 is in a closed state in order to support the smooth conveyance of the roll sheet. Also, due to control by the print controller 419 and the conveyance control unit 426, the rotation speed (V) of the conveyance rollers 28 is controlled to be the same as that of the LF roller 29 (i.e., V=V0) and the nip pressure of the conveyance rollers 28 is controlled to be "weak (first pressure)".

By such control, the roll sheet is conveyed without forming a loop.

FIG. 5B illustrates a state in which conveyance of the roll sheet by the conveyance rollers 28 and the LF roller 29 and printing by the printhead 3 progress and the cutting position of the roll sheet R1 has approached the position of the cutter 25. At such a time, the flapper 32 is in an open state in order to provide a space that is necessary for forming a loop in the roll sheet. In this embodiment, specifically, when the remaining length, in regards to the conveyance direction of the roll sheet, from the printing position by the printhead 3 to the end of printing reaches approximately 1.5 L to 2.0 L, the loop formation is started.

Note that the timing to start forming the loop is not limited to this numerical value and is to be determined by the internal structure of the printing apparatus such as the relationship between the arrangement positions of the respective components, and so another value may be used in accordance with the apparatus.

Also, due to control by the print controller 419 and the conveyance control unit 426, the rotation speed (V) of the conveyance rollers 28 is controlled to be faster than that of the LF roller 29 (i.e., V=V1>V0) and the nip pressure of the conveyance rollers 28 is controlled to be "strong (second pressure)".

By such control, the loop 31 is formed in the roll sheet as indicated by a dashed arrow in FIG. 5B and the roll sheet is conveyed.

FIG. 5C illustrates a state in which the trailing end of the roll sheet has been cut by the cutter 25.

When it is determined that the conveyance amount of the roll sheet that corresponds to the length from the leading end of the roll sheet to the position of the cutter 25 has reached the length of the cut sheet to be determined by either a user instruction from the operation panel 100 or an instruction from the host apparatus 400, the roll sheet is cut by the cutter 25. At this time, due to control by the print controller 419 and the conveyance control unit 426, the rotation speed (V) of the conveyance rollers 28 is controlled to be the same as that of the LF roller 29 (i.e., V=V0) and the nip pressure of the conveyance rollers 28 is controlled to be "strong".

By such control, the loop 31 that was formed in the roll sheet, in conjunction with the conveyance of the cut sheet, as indicated by the dashed arrow in FIG. 5C, will gradually become smaller and then eliminated. Also, the flapper 32, in conjunction with the reduction of the loop 31, transitions from an opened state to a closed state.

Figure 6:
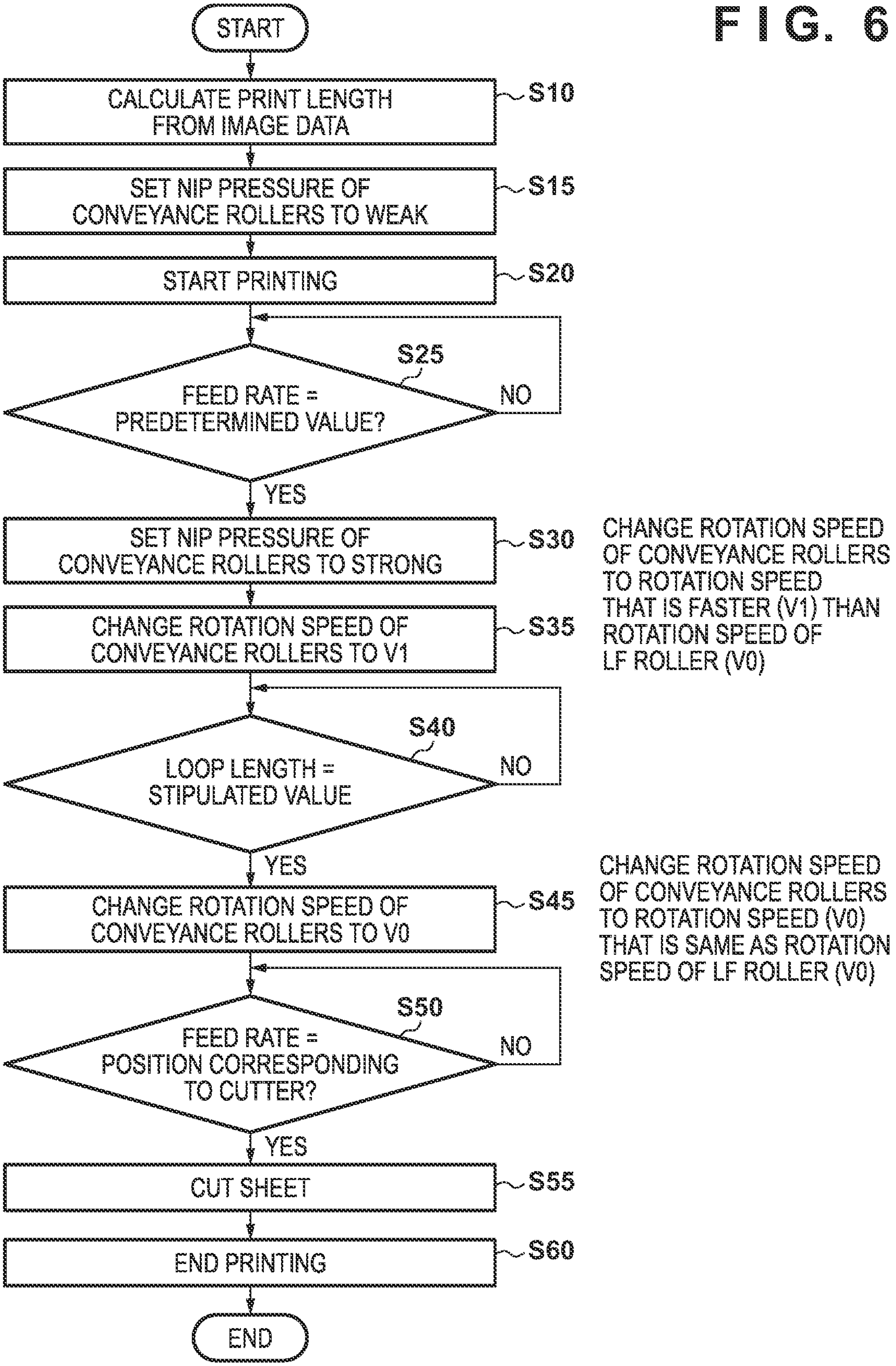
FIG. 6 is a flowchart illustrating control for conveying the roll sheet.

FIG. 6 is a flowchart illustrating control for conveying the roll sheet as illustrated in FIGS. 5A to 5C. This conveyance control involves not only the components illustrated in FIGS. 5A to 5C but also the main controller 401, the print controller 419, the conveyance control unit 426, and the like, whereby the control is executed.

According to FIG. 6, first, in step S10, a print length in the conveyance direction of the roll sheet is calculated based on image data that was transmitted to the printing apparatus 1 from the host apparatus 400. Note that the print length may be set based on a value that the user inputted from the operation panel 100. Next, in step S15, the nip pressure of the conveyance rollers 28 is set to "weak".

When these calculations and settings are completed, the printing apparatus 1, in step S20, by controlling the conveyance control unit 426, feeds, for example, the roll sheet R1 that is attached onto the roll sheet attachment unit 4*a* to the printing position by the printhead 3 and then starts printing. At this time, the roll sheet R1 is nipped by the conveyance rollers 28 and the LF roller 29 and then conveyed as described with reference to FIG. 5A. Here, the rotation speed (V) of the conveyance rollers 28 is controlled to be the same as that of the LF roller 29 (i.e., V=V0). Also, the flapper 32 is in a closed state, and a loop is not formed in the roll sheet R1.

Next, in step S25, while the printing operation by the printhead 3 is continuing, it is monitored whether the conveyance amount (feed rate) by the conveyance rollers 28 has reached a predetermined value. Here, when it is confirmed that the conveyance amount has reached the predetermined value, the processing advances to step S30. The conveyance amount is calculated by counting encoder signal pulses that are outputted from a rotary encoder (not shown), which is disposed near the conveyance rollers 28, or input pulses to a stepping motor that drives the conveyance rollers.

In step S30, it is determined that printing by the printhead 3 has progressed and that a trailing end of the calculated print length is approaching, and the nip pressure of the conveyance rollers 28 is thereby set to "strong". Furthermore, in step S35, the rotation speed (V) of the conveyance rollers 28 is changed so as to be faster than that of the LF roller 29 (i.e., V=V1>V0). By these processes, the loop 31 is formed in the roll sheet by the difference in the rotation speeds (V) of the conveyance rollers 28 and the LF roller 29. At this time, the flapper 32 enters an opened state as described with reference to FIG. 5B.

By such processing, as printing comes closer to the end, a loop is formed in the roll sheet and in step S40, it is examined whether the length of the loop has reached a stipulated value. Here, when it is confirmed that the length of the loop has reached the predetermined value, the processing advances to step S45. Note that the length of the loop is calculated by a difference in the rotation speeds (V) of the conveyance rollers 28 and the LF roller 29 and an elapsed time from when the loop started forming. Also, during the loop formation, by setting the nip pressure of the conveyance rollers 28 to "strong" and then conveying the roll sheet, the occurrence of slips between the roll sheet and the conveyance roller is reduced.

In step S45, the rotation speed (V) of the conveyance rollers 28 is again changed to be the same as that of the LF roller 29 (i.e., V=V0). By this, the loop 31 of the roll sheet becomes smaller as described with reference to FIG. 5C and then in the end, is eliminated. Note that the nip pressure by the conveyance rollers 28 in the stage of causing the loop 31 to be eliminated is maintained at a "strong" state.

Furthermore, in step S50, it is examined whether the end of the print length that was estimated based on the conveyance amount of the roll sheet by the conveyance rollers 28 has reached the position of the cutter 25. Here, if it is determined that the end of the print length has reached the position of the cutter 25, the processing advances to step S55. As described with reference to FIGS. 5A to 5C, the distance between the position of cutting by the cutter 25 and the nip point by the conveyance rollers 28 is L, and so it can be determined whether to operate the cutter 25 by examining whether a conveyance amount +L of the roll sheet has reached the print length.

In step S55, the cutter 25 is operated and the roll sheet is cut. This cutting point is a point that corresponds to the length from the leading end of the roll sheet to the print length. Then, printing by the printhead 3 and the conveyance of the cut sheet are continued, and in step S60, the printing is ended and the cut sheet whose printing was ended is discharged into the back surface basket 60 or onto the front surface stacker 61 based on a user instruction from the operation panel 100 or an instruction from the host apparatus 400.

Hence, according to the embodiment described above, because a loop is formed by increasing the nip pressure of the conveyance rollers only in the vicinity of the printing end edge of the roll sheet, the occurrence of slips is reduced, thereby making it possible to reduce errors in the conveyance amount of a sheet, which is associated with loop formation. By this, the accumulation of errors in the conveyance amount that accompany loop formation will be reduced even in cases where printing is performed on sheets whose print lengths are long, thereby enabling more accurate conveyance, which enables higher quality printing.

Note that although in the embodiment described above, description was given using a printing apparatus on which a full-line printhead is provided as an example, the present invention is not limited by this. For example, it is also possible to apply the present invention to a printing apparatus, in which a printhead is provided on a carriage that moves back and forth in a direction that is perpendicular to the conveyance direction of printing media, configured to perform printing by discharging ink from the printhead while causing the carriage to move back and forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-085492, filed May 14, 2020, which is hereby incorporated by reference herein in its entirety.

What is claimed is:

1. A printing apparatus comprising:
- a first roller configured to nip and convey, in a conveyance direction, a printing medium;
- a second roller configured to nip and convey the printing medium at a downstream side of the first roller in the conveyance direction;
- a print unit configured to print an image on the printing medium conveyed by the second roller; and
- a control unit configured to, until printing by the print unit reaches a vicinity of a trailing end of a print length, set a nip pressure of the first roller to a first pressure, and when printing by the print unit reaches the vicinity of the trailing end of the print length, set the nip pressure of the first roller to a second pressure that is higher than the first pressure.

2. The printing apparatus according to claim 1, wherein the control unit, when the vicinity of the trailing end of the print length is reached, increases a conveying speed of a printing medium by the first roller.

3. The printing apparatus according to claim 2, wherein the control unit, until printing by the print unit reaches the vicinity of the trailing end of the print length, sets conveying speeds of the first roller and the second roller to be the same, and when printing by the print unit reaches the vicinity of the trailing end of the print length, sets the conveying speed of the first roller to be higher than the conveying speed of the second roller so as to control to form a loop of the printing medium in a conveyance path of the printing medium between the first roller and the second roller.

4. The printing apparatus according to claim 3, further comprising:
- a feeding unit configured to feed the printing medium;

a conveyance unit configured to nip, by the first roller and the second roller, the printing medium fed by the feeding unit and convey the nipped printing medium;

a cutting unit, provided in the conveyance path of the printing medium between the first roller and the feeding unit, configured to cut the printing medium fed from the feeding unit; and a calculation unit configured to calculate a conveyance amount of the printing medium by the conveyance unit, wherein the control unit, in a case where it is determined, based on the conveyance amount of the printing medium calculated by the calculation unit, that a position of the printing medium corresponding to the print length has reached a position where the cutting unit is provided, controls the cutting unit to operate and cut the printing medium.

5. The printing apparatus according to claim 4, wherein the control unit, in a case where while a printing operation by the print unit is continuing, the conveyance amount of the printing medium calculated by the calculation unit has reached a predetermined value, determines that printing by the print unit has reached the vicinity of the trailing end of a print length.

6. The printing apparatus according to claim 5, wherein the predetermined value, in a case where a distance between the position where the cutting unit is provided and the first roller is L, is determined based on the print length and 1.5 L to 2.0 L.

7. The printing apparatus according to claim 4, wherein the calculation unit, by counting an encoder signal pulse outputted from a rotary encoder provided near the first roller or an input pulse to a stepping motor that drives the first roller, calculates the conveyance amount of the printing medium.

8. The printing apparatus according to claim 3, further comprising:

a determination unit configured to determine whether a length of the formed loop has reached a stipulated value that is defined in advance, wherein the control unit, in a case where it is determined by the determination unit that the length of the formed loop has reached the stipulated value that is defined in advance, controls so that the conveying speed of the first roller is the same as the conveying speed of the second roller and controls so as to eliminate the formed loop.

9. The printing apparatus according to claim 8, wherein the control unit controls so as to maintain the nip pressure by the first roller at the second pressure.

10. The printing apparatus according to claim 1, wherein the print length is calculated based on image data transmitted from a host apparatus connected to the printing apparatus or an input by a user from an operation panel of the printing apparatus.

11. The printing apparatus according to claim 1, wherein the print unit is a full-line print unit having a print width corresponding to a width of the printing medium.

12. The printing apparatus according to claim 1, wherein the printing medium is a roll sheet, and the apparatus comprises at least two attachment units configured to attach the roll sheet.

13. A printing apparatus comprising:

a first roller configured to nip and convey, in a conveyance direction, a printing medium;

a second roller configured to nip and convey the printing medium at a downstream side of the first roller in the conveyance direction;

a print unit configured to print an image on the printing medium conveyed by the second roller; and a control unit configured to set a conveying speed of the printing medium by the first roller, after printing by the print unit reaches the vicinity of the trailing end of the print length, to be higher than a conveying speed of the first roller, until printing by the print unit reaches the vicinity of the trailing end of the print length.

14. The printing apparatus according to claim 13, wherein the control unit, when the vicinity of the trailing end of the print length is reached, sets a nip pressure of a printing medium by the first roller from a first pressure to a second pressure that is higher than the first pressure.

15. The printing apparatus according to claim 14, wherein the control unit, after printing by the print unit reaches the vicinity of the trailing end of the print length, sets the conveying speed of the first roller to be higher than a conveying speed of the second roller so as to control to form a loop of the printing medium in a conveyance path of the printing medium between the first roller and the second roller.

16. A conveyance control method of a printing apparatus having a first roller that nips and conveys, in a conveyance direction, a printing medium; a second roller that nips and conveys the printing medium at a downstream side of the first roller in the conveyance direction; and a print unit that prints an image on the printing medium conveyed by the second roller, the method comprising:

controlling, until printing by the print unit reaches a vicinity of a trailing end of a print length, to set a nip pressure of the first roller to a first pressure, and when printing by the print unit reaches the vicinity of the trailing end of the print length, to set the nip pressure of the first roller to a second pressure that is higher than the first pressure.

* * * * *